(12) United States Patent
Ishibashi et al.

(10) Patent No.: US 8,425,824 B2
(45) Date of Patent: Apr. 23, 2013

(54) PROCESS FOR PRODUCING HOLLOW-FIBER MEMBRANE FILTER ELEMENT WITH A MIXTURE OF TWO-LIQUID MIXING TYPE CURABLE RESIN

(75) Inventors: Yuzuru Ishibashi, Tokyo (JP); Akihiro Watanabe, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 770 days.

(21) Appl. No.: 12/307,814

(22) PCT Filed: Jul. 9, 2007

(86) PCT No.: PCT/JP2007/063699
§ 371 (c)(1),
(2), (4) Date: Oct. 5, 2009

(87) PCT Pub. No.: WO2008/007652
PCT Pub. Date: Jan. 17, 2008

(65) Prior Publication Data
US 2010/0044908 A1  Feb. 25, 2010

(30) Foreign Application Priority Data
Jul. 10, 2006 (JP) .................... 2006-189287

(51) Int. Cl.
*B29C 70/42* (2006.01)
*B32B 37/12* (2006.01)
*B01F 5/06* (2006.01)
*B01F 13/00* (2006.01)

(52) U.S. Cl.
USPC .......... 264/257; 264/258; 264/311; 366/339; 366/348

(58) Field of Classification Search .................. None
See application file for complete search history.

(56) References Cited

U.S. PATENT DOCUMENTS

| 3,607,124 | A | 9/1971 | Zippel |
| 5,275,545 | A | 1/1994 | Ohyanagi et al. |
| 6,281,278 | B1 * | 8/2001 | Takase et al. .................. 524/497 |
| 7,281,844 | B2 * | 10/2007 | Glanville ...................... 366/340 |
| 2004/0178136 | A1 * | 9/2004 | Taniguchi et al. ....... 210/321.79 |

FOREIGN PATENT DOCUMENTS

| CA | 2 540 176 | 4/2005 |
| DE | 28 23 762 A1 | 12/1978 |
| EP | 0 952 173 A1 | 10/1999 |
| JP | 5-31426 | 2/1993 |
| JP | 5-237839 | 9/1993 |
| JP | 6-39248 | 2/1994 |
| JP | 11-207733 | 8/1999 |
| JP | 2000-297134 | 10/2000 |

* cited by examiner

OTHER PUBLICATIONS

Extended European Search Report for EP Application No. 07790520.6 dated Nov. 9, 2012.

*Primary Examiner* — Christina Johnson
*Assistant Examiner* — Benjamin Schiffman
(74) *Attorney, Agent, or Firm* — Finnegan, Henderson, Farabow, Garrett & Dunner, L.L.P.

(57) ABSTRACT

An object of the present invention is to provide a process for producing a mixture of a two-liquid mixing type curable resin, which process is hard to generate curing unevenness, can be carried out with low energy consumption, and is suited for mixing even with a disposable static mixer.

The present invention provides a process for producing a mixture of a two-liquid mixing type curable resin by mixing the constituents of the resin, wherein mixing operations of the constituents are performed multiple times and a non-mixing time is provided between at least one of the mixing operations and another one of the mixing operations subsequent thereto.

8 Claims, 5 Drawing Sheets

PROCESS FOR PRODUCING HOLLOW-FIBER MEMBRANE FILTER ELEMENT WITH A MIXTURE OF TWO-LIQUID MIXING TYPE CURABLE RESIN

CROSS REFERENCE TO RELATED APPLICATIONS

This application is a National Phase application based on PCT/JP2007/063699 filed on Jul. 9, 2007, and claims the priority of Japanese Application No. 2006-189287, filed Jul. 10, 2006, the content of both of which is incorporated herein by reference.

TECHNICAL FIELD

The present invention relates to a process for producing a mixture of a two-liquid mixing type curable resin by mixing the constituents of the resin. More specifically, the invention relates to a process for a mixture of a two-liquid mixing type curable resin to be used for producing a hollow-fiber membrane filter element; and a process for producing a hollow-fiber filter element using the method.

BACKGROUND ART

In the manufacture of a hollow-fiber membrane filter element, a two-liquid mixing type epoxy resin or urethane resin is typically used as a potting material (fixing agent) in order to adhere and fix hollow-fiber membranes and thereby form a partition portion. During formation of the partition portion, constituents of the adhesive, that is, a base and a curing agent are measured and mixed and then, the resulting mixture is injected into the space between hollow-fiber membranes within a time while it has fluidity.

Hollow-fiber membrane filter elements are used in many fields such as various industrial processes, production of drinking water, and sewage treatment. In many cases, filter elements having a diameter of from 80 to 300 mm are used. For manufacturing such a relatively large-sized filter element, a adhesive curable within a period of time short but enough to complete a bonding operation and capable of achieving high productivity is preferred. A adhesive having a pot life TP of from 5 to 60 minutes is often employed.

A adhesive for forming a partition portion of a hollow-fiber membrane filter element is apt to cause inadequate mixing because miscibility between a base and a curing agent is not good due to poor compatibility therebetween. Accordingly, there sometimes occurs unevenness in the cured state of the adhesive. For injecting the mixture between hollow-fiber membranes, it is the common practice to employ static potting method of injecting the mixture while utilizing a head differential or pump pressure and a centrifugal potting method of injecting the mixture by utilizing a centrifugal force. The latter centrifugal potting method is preferred because it facilitates formation of a uniform interface. In the centrifugal potting method, when the miscibility between a base and a curing agent is poor, partial unevenness in the mechanical strength after curing (which will hereinafter be called "curing unevenness") is apt to occur due to separation of the adhesive into two layers by the centrifugal force. In the hollow-fiber membrane filter element, the partition portion has a function of keeping pressure resistance so that presence of curing unevenness is a serious problem leading to inferior quality of the filter element as a product.

The constituents of a two-liquid mixing type adhesive are mixed, for example, by a method of rotating a stirring blade in a vessel or by a method of feeding them into a static mixer with a pump. A method of mixing them in a disposable static mixer is preferably employed because it does not need washing after use. When a static mixer without mixing elements is used, however, the constituents cannot be mixed uniformly and the resin obtained by the reaction tends to have curing unevenness. When a static mixer is equipped with many mixing elements in order to attain sufficient mixing, on the other hand, feeding of a mixed liquid requires a very high pressure.

Since a disposable static mixer is typically made of plastic, only a low pressure can be applied to it. In order to mix the constituents within a usable pressure range, mixing must be performed at a low flow rate and it takes long hours to obtain a predetermined amount of the mixture. This makes it difficult to complete the bonding step within the pot life of the adhesive.

With a view to overcoming the above-described problem, Japanese Patent Application Laid-Open No. Hei 5-31426 (Patent Document 1) discloses, as a method of using a disposable static mixer under high pressure, a method of sandwiching the outer portion of the disposable static mixers with metallic holders and connecting the static mixers with a metal block. This method however has problems such as necessity of a disassembly or assembly work of the holders whenever the static mixers are used and excessively high energy consumption for feeding under high pressure.

Patent Document 1: Japanese Patent Application Laid-Open No. Hei 5-31426

DISCLOSURE OF THE INVENTION

Problems to be Solved by the Invention

An object of the present invention is therefore to provide a process for producing a mixture of a two-liquid mixing type curable resin which process generates less curing unevenness, can prepare the mixture at low energy consumption, and can be performed preferably even if a disposable static mixer is used.

Means for Solving the Problems

The present inventors have carried out an extensive investigation with a view to overcoming the above-described problems. As a result, it has been found that in a process for mixing the constituents of a two-liquid mixing type curable resin, thereby obtaining a mixture of them, curing unevenness of a cured product can be reduced greatly by carrying out a mixing operation after the constituents are reacted to some extent, more specifically, the above-described problems can be overcome by carrying out mixing operations of the constituents multiple times and providing a non-mixing time between at least one of the mixing operations and another one of the mixing operations subsequent thereto. It has been found that particularly in a method of obtaining a mixture by using a static mixer, the above-described problem can be overcome especially preferably by placing two or more static mixers in series, disposing a non-stirring portion having no mixing elements between at least one of the static mixers and another one of the static mixers of a next stage, and controlling a total volume of the non-stirring portion to fall within a certain range, leading to the completion of the present invention.

The present invention will hereinafter be described.

[1] A process for producing a mixture of a two-liquid mixing type curable resin, comprising mixing constituents of the two-liquid mixing type curable resin, wherein mixing operations of the constituents are carried out multiple times and a non-mixing time is provided between at least one of the mixing operations and another one of the mixing operations subsequent thereto.

[2] A process for producing a mixture of a two-liquid mixing type curable resin, comprising mixing constituents of the two-liquid mixing type curable resin, wherein the constituents are fed into a mixing channel in which two or more static mixers are arranged in series, a non-stirring portion having no mixing element is disposed between at least one of the static mixers and another one of the static mixers placed downstream thereof, and a total volume of the non-stirring portion(s) is from 2 to 10 times as much as a total volume of mixing portions of the static mixers.

[3] A process for producing a hollow-fiber membrane filter element, comprising a step of injecting a mixture of a two-liquid mixing type curable resin produced by a process for producing a mixture of a two-liquid mixing type curable resin according to the present invention, into an end portion of a hollow-fiber membrane bundle composed of a plurality of hollow-fiber membranes and solidifying the mixture, thereby bonding and fixing the end portion of the hollow-fiber membrane bundle.

[4] A process for producing a hollow-fiber membrane filter element, comprising:

a step of carrying out at least one mixing operation of constituents of a two-liquid mixing type curable resin to obtain a mixed liquid and then providing a non-mixing time; and a step of feeding the mixed liquid into a static mixer by a centrifugal force to obtain a mixture of the two-liquid mixing type curable resin, injecting the mixture of the two-liquid mixing type curable resin into an end portion of a hollow-fiber membrane bundle by a centrifugal force and solidifying the mixture, thereby bonding and fixing the end portion of the hollow-fiber membrane bundle.

Advantage of the Invention

The process of the present invention enables to obtain a cured product free from curing unevenness at low energy consumption even if a two-liquid mixing type curable resin composed of constituents having poor compatibility with one another is used. Particularly in the case where a static mixer is used, the constituents can be mixed at a low pressure and at the same time, a good cured product free from curing unevenness can be obtained. Although this process for producing a mixture can be used for ordinary mixing of a two-liquid mixing type curable resin, it is especially useful as a process for producing a mixture of an adhesive in the production of a hollow-fiber membrane filter element. Moreover, the process for producing a hollow-fiber membrane filter element according to the present invention enables efficient production of a hollow-fiber membrane filter element whose partition portion is made of a two-liquid mixing type curable resin having no defects such as curing unevenness.

BEST MODE FOR CARRYING OUT THE INVENTION

The two-liquid mixing type curable resin to be used in the process for producing a mixture and the process for producing a hollow-fiber membrane filter element according to the present invention is a resin which cures by mixing a plurality of compounds having reactivity. The term "two liquid" as used herein is a conceptual expression meaning that two or more constituents are reactive with each other. For example, when there are compounds A, B and C and A and B, A and C, and B and C are reactive with each other, these three compounds must be stored separately and mixed upon use. Such compounds are also embraced in the two-liquid mixing type curable resin of the present invention. In addition, it is not always necessary that all the compounds are in liquid form and the present invention also embraces the following case where at least one compound is in liquid form and it is mixed with a solid component while dissolving it therein upon use.

Specific examples of the two-liquid mixing type curable resin to be used in the process of the present invention include two-liquid mixing type urethane resins and epoxy resins. Various compounds serve as components forming the constituents of these resins and miscibility differs, depending on the combination of them. When the constituents of the resin are mixed and the resulting mixed liquid becomes turbid immediately after mixing, they are inferior in miscibility and are apt to cause curing unevenness when cured. The advantage of the present invention appears remarkably in such a two-liquid mixing type curable resin.

The term "constituents of the two-liquid mixing type curable resin" means "mixtures containing a reactive compound" which are called "base" and "curing agent", respectively, in the art and the mixture may contain a non-reactive compound. In the present invention, for example in the epoxy resin or urethane resin, a mixture containing an epoxy-containing compound or an isocyanate-containing compound is called "base", while a mixture containing an active hydrogen compound is called "curing agent".

The first embodiment of the present invention will hereinafter be described specifically.

In the first embodiment of the present invention, there is provided a process for obtaining a mixture of a two-liquid mixing type curable resin by mixing the constituents of the two-liquid mixing type curable resin, wherein the constituents are mixed by performing mixing operations multiple times and a non-mixing time is provided between at least one mixing operation and another mixing operation subsequent thereto.

The term "non-mixing time" as used herein means a period of time during which the constituents are under a non-mixing state. The "non-mixing state" means a state under which no positive operation intended for mixing such as stirring is performed. For example, when the constituents are left at rest after mechanical stirring in a vessel, the "non-mixing state" means this state of the constituents left at rest. In an operation for transferring the constituents to be mixed, for example, an operation of only feeding them in a pipe or an operation for changing the vessel to another one, a relatively weak mixing phenomenon is presumed to occur with a liquid flow. In the present invention, however, the constituents are regarded as being under a non-mixing state when they are subjected to an operation for the purpose of only transferring the constituents to be mixed.

By at least one mixing operation, the base and the curing agent are mixed roughly to form a sea-island dispersion. During the non-mixing time after this operation, a chemical reaction proceeds on the interface of dispersed particles and a reaction product between the base and the curing agent is formed. Since the resulting reaction product functions as a compatibilizing agent of the base and the curing agent, a stirring operation performed again in the presence of the reaction product is presumed to contribute to the formation of a good mixed condition and preparation of a cured product free from curing unevenness in the end.

The non-mixing time may be provided multiple times, and the total time TN of them is preferably from 2 to 100 times as much as the total time TB of mixing operations. The total time TN less than 2 times may tend to lessen the energy saving effect. The total time TN exceeding 100 times, on the other hand, may tend to raise the viscosity due to excessive progress of the reaction, leading to too much consumption of mixing energy or prevent smooth operation after mixing such as injecting of the mixture into a hollow-fiber membrane bundle.

In addition, a ratio of the total time TN of the non-mixing time to the pot life TP of the two-liquid mixing type curable resin is preferably from 0.001 to 0.5. The ratio less than 0.001 may tend to lessen the energy saving effect because the reaction does not proceed sufficiently. The ratio exceeding 0.5, on the other hand, may tend to raise the viscosity due to excessive progress of the reaction, leading to too much consumption of mixing energy or prevent smooth operation after mixing such as injecting of the mixture into a hollow-fiber membrane bundle. The ratio is more preferably from 0.001 to 0.1, especially preferably from 0.001 to 0.02.

In the present invention, the "pot life" of the two-liquid mixing type curable resin is determined in the following manner. The constituents are weighed to give a total amount of 100 g and they are mixed for 60 seconds and deaerated for 30 seconds in a rotary mixer/deaerator. After the deaeration, The "pot life" can be set as a period of time from starting of mixing (rotation) in the rotary mixer/deaerator to the time when the viscosity of the mixed liquid measured with time by a digital rotary viscometer reaches 10 Pa·s.

In the process for producing a mixture of the two-liquid mixing type curable resin according to the present invention, a reaction of the constituents starts when the first mixing operation is performed. The final mixing operation is preferably performed when the constituents are each dispersed as particles having an average mode particle size of from 0.1 to 100 μm. Dispersion of the constituents as particles having an average particle size within the above-described range enables effective formation of a reaction intermediate and achieves an energy saving effect. The dispersed particle size can be measured in a known manner such as dynamic light scattering method.

In the first embodiment of the present invention, use of the two-liquid mixing type curable resin having a pot life from 5 to 60 minutes has a great energy saving effect. A resin having a pot life less than 5 minutes or exceeding 60 minutes tends to show a less energy saving effect.

Examples of resins having such a pot life include urethane resins and epoxy resins. Urethane resins are especially preferred, because owing to relatively small cure shrinkage, a cured product available from them has good dimensional accuracy.

Examples of the base constituting the two-liquid mixing type curable resin include those containing, as a main component, an aromatic polyisocyanate such as 4,4'-diphenylmethane diisocyanate (which will hereinafter be abbreviated as MDI), polymethylene polyphenylene polyisocyanate (which will hereinafter be abbreviated as polymeric MDI), or tolylene diisocyanate; an aliphatic polyisocyanate such as hexamethylene diisocyanate; or an alicyclic polyisocyanate such as isophorone diisocyanate or 4,4'-methylenebis(cyclohexane isocyanate). Of these, the bases containing the aromatic polyisocyanate as a main component are preferred because they have adequate reactivity and a cured product having good mechanical strength can be obtained even in the absence of a catalyst.

Examples of the curing agent constituting the two-liquid mixing type curable resin include those having, as a main component, a hydrocarbon polyol such as polyester polyol, polyether polyol, polycarbonate polyol, polybutadiene glycol, or polyisoprene polyol, or a castor oil polyol. Of these, the curing agents containing, as a main component, polybutadiene glycol or a castor oil polyol are especially preferred because from them, a cured product having water resistance and resistance to chemicals such as alkali or oxidizing agent can be obtained.

Although no particular limitation is imposed on the mixing operation, examples include a method of mechanical stirring in a mixing tank and a method of feeding a static mixer with liquids to be mixed. The mixing operation must be performed multiple times. Mixing may be performed multiple times at some intervals in one mixer or by transferring liquids to be mixed among a plurality of mixers.

Examples of the Method Include:

(a) a method of mixing the constituents for a predetermined time while rotating a stirring blade in a mixing tank, terminating the stirring, leaving the resulting mixture at rest for a predetermined time, and then rotating the stirring blade again to mix the resulting mixture;

(b) a method of connecting in series a plurality of mixing tanks equipped with a stirring blade and successively feeding the liquid to be mixed;

(c) a method of connecting a mixing tank equipped with a stirring blade to a static mixer and successively feeding liquids to be mixed from the mixing tank to a static mixer; and (d) a method of connecting a plurality of static mixers in series and successively feeding them with liquids to be mixed.

In the methods (b) to (d), two or more mixers are connected via a pipe and a non-stirring portion for realizing a non-mixing state is provided at some position of the pipe.

The static mixer has a cylindrical frame and mixing units housed therein. The mixing units are each made of a plurality of elements connected to each other in the longitudinal direction. Each of the elements has a shape obtained, for example, by twisting a plate-like body by 180° in the circumferential direction along the longitudinal direction. Any two elements adjacent to each other are twisted in mutually opposite directions so that the liquids to be mixed move in the flame while being inverted, whereby they are mixed into a uniform dispersion by the elements. The number of mixing units in the static mixer is preferably from 10 to 50.

After completion of the mixing operations of the two-liquid mixing type curable resin, it is always necessary to wash the mixers and pipes used therefor to prepare for subsequent mixing operations. A large amount of a solvent is necessary for washing, which leads to disposal of a large amount of the waste. In order to avoid it, inexpensive disposable static mixers made of plastic are now commercially available. Use of them enables a drastic reduction in the waste because a washing step of the mixer with a solvent can be omitted.

In the next place, the second embodiment of the present invention will be described more specifically.

In the second embodiment of the present invention, there is provided a process of mixing the constituents of a two-liquid mixing type curable resin, wherein the constituents are fed to and through a mixing channel in which two or more static mixers are arranged in series and a non-stirring portion having no mixing element is disposed between at least one static mixer and another static mixer placed downstream thereof. The total volume of the non-stirring portion is from 2 to 10 times as much as the total volume of the mixing portions of the static mixers.

As the static mixer, that described in the first embodiment can be used.

It is necessary to connect a plurality of the static mixers in series and dispose a non-stirring portion having no mixing element between at least one of the static mixers and another one of the static mixers downstream thereof. The reaction of the liquids to be mixed proceeds while they pass through this non-stirring portion and by mixing in the next stage, a uniform dispersion can be obtained in the presence of the reaction intermediate. The total volume of the non-stirring portion need to be from 2 to 10 times as much as the total volume of the mixing portions of the static mixers. The total volume of the non-stirring portion less than 2 times only shows a small energy saving effect, while the total volume exceeding 10 times is not economical because of an increase in the remaining amount of the resin in the non-stirring portion. The total volume of the non-stirring portion is especially preferably from 2 to 5 times as much as the total volume of the mixing portions of the static mixers.

When use of two static mixers is not sufficient for mixing, the number of the static mixers can be increased to three or more.

When three or more static mixers are used, a plurality of non-stirring portions can be disposed. For example in the case of three static mixers, the non-stirring portion may be disposed between the static mixers of the first stage and the second stage or between the static mixers of the second stage and the third stage, or both between the static mixers of the first and the second stage and the static mixers of the second stage and the third stage.

When three static mixers are placed and a non-stirring portion is disposed between the static mixers of the first stage and the second stage and the static mixers of the second stage and the third stage, the total volume of these two non-stirring portions is adjusted to from 2 to 10 times as much as the total volume of the mixing portions of these three static mixers. When a non-stirring portion is disposed between the static mixers of the first stage and the second stage and a non-stirring portion is not disposed between the static mixers of the second stage and the third stage, the volume of the non-stirring portion is adjusted to from 2 to 10 times as much as the total volume of the mixing portions of the three static mixers.

The shape of the non-stirring portion having no mixing element is not limited, but is preferably a tubular structure which does not easily cause retention. The non-stirring portion is preferably made of a material which is free from dissolution or corrosion by the liquids to be mixed or elution into the liquids to be mixed. Examples include metal materials such as stainless steel and aluminum, and plastic materials such as PVC and PE.

Of these, the non-stirring portion made of an inexpensive plastic material is preferred because it permits application of a disposable using method not requiring a washing step. With regard to the material and shape, the non-stirring portion preferably has a flexible tubular shape. The non-stirring portion having a flexible tubular shape improves the freedom of selecting an discharging direction or place of the mixed liquid and enhances bonding workability of a hollow-fiber membrane filter element.

FIG. 1 illustrates a non-stirring portion 2 not comprising a mixing element connected between a static mixer 1 of the first stage and a static mixer 1' of the second stage.

FIG. 2 illustrates one example of the structure of a static mixer to be employed in the present invention.

Application of the second embodiment of the present invention to a two-liquid mixing type curable resin having a pot life of from 5 to 60 minutes produces a great energy saving effect. Resins having a pot life less than 5 minutes or exceeding 60 minutes tend to have a less energy-saving effect.

Examples of the resin having such a pot life include urethane resins and epoxy resins. Urethane resins are especially preferred because owing to relatively small cure shrinkage, they show good dimensional accuracy when cured. The base and the curing agent constituting the two-liquid mixing type urethane resin are same as or similar to those described in the first embodiment.

Also in the second embodiment, a ratio of the total time TN of the non-mixing time, that is, the total time during which the constituents pass through the non-stirring portion, to the pot life TP of the two-liquid mixing type curable resin is preferably from 0.001 to 0.5. The ratio less than 0.001 may tend to lessen the energy saving effect because the reaction does not proceed sufficiently. The ratio exceeding 0.5, on the other hand, may raise a viscosity due to excessive progress of the reaction, which may lead to too much consumption of mixing energy or may tend to prevent smooth operation after mixing such as injecting of the mixture into a hollow-fiber membrane bundle. The ratio is more preferably from 0.001 to 0.1, especially preferably from 0.001 to 0.02.

The third embodiment of the present invention will hereinafter be described specifically.

In the third embodiment of the present invention, there is provided a process for producing a hollow-fiber membrane filter element, characterized in that—in injecting a mixture of a two-liquid mixing type curable resin into an end portion of a hollow-fiber membrane bundle composed of a plurality of hollow-fiber membranes and solidifying the mixture and thereby bonding and fixing the end portion of a hollow-fiber membrane bundle—feeding the constituents of the two-liquid mixing type curable resin in a mixing channel in which two or more static mixers are arranged in series, a non-mixing portion having no mixing elements is disposed between at least one of the static mixers and another one of the static mixers downstream thereof, and the total volume of the non-stirring portion is from 2 to 10 times as much as the total volume of the mixing portions of the static mixers and mixing the constituents; and then injecting the resulting mixture into the end portion of a hollow-fiber membrane bundle to solidify it.

The arrangement and volume of the static mixers and the non-stirring portion in the third embodiment are same as or similar to those described in the first embodiment or the second embodiment.

In the process for producing a hollow-fiber membrane filter element according to the present invention, the two-liquid mixing type curable resin has a pot life of preferably from 5 to 60 minutes, more preferably from 15 to 50 minutes, especially preferably from 15 minutes to 40 minutes. When the pot life is less than 5 minutes, defects may sometimes occur in the partition portion due to insufficient injecting time between hollow-fiber membranes. On the other hand, the pot life exceeding 60 minutes is not preferred, because it takes much time to complete a curing reaction, leading to poor productivity.

In the process for producing a hollow-fiber membrane filter element according to the present invention, the constituents of the two-liquid mixing type curable resin each has a viscosity of preferably from 0.5 to 6.0 Pa·s, especially preferably from 1.0 to 4.0 Pa·s. In addition, a difference in the viscosity between the constituents is especially preferably as small as possible when they are mixed in a static mixer. Moreover, the viscosity after mixing is preferably from 0.5 to 4.0 Pa·s. When the viscosity is less than 0.5 Pa·s, there is a strong tendency for the mixture to be soaked up through the space between hollow-fiber membranes by capillary action. When the hollow-fiber membranes are fixed under such a state, the membranes easily break at this position during a filtering operation. When the viscosity after mixing exceeds 4.0 MPa·s, on the other hand, the mixture does not easily penetrate into the membrane bundle and a uniform adhesion interface tends not to be obtained.

Examples of the two-liquid mixing type curable resin having such flow characteristics or curing characteristics include two-liquid mixing type urethane resins and epoxy resins. Of these, urethane resins are especially preferred because owing to a relatively small curing shrinkage, a residual stress occurring in the cured product of them is small, which enables formation of a partition portion having high durability.

As the base and the curing agent each constituting the two-liquid mixing type urethane resin, those described above in the first embodiment can be used and no particular limitation is imposed on them. Since the two-liquid mixing type curable urethane resin forming a partition portion of a hollow-fiber membrane filter element is desirably excellent in mechanical strength, water resistance, and chemical resistance, use of a base composed mainly of MDI or polymeric MDI and a curing agent composed mainly of polybutadiene glycol or castor oil polyol in combination is especially preferred. In the conventional process, such a combination is apt to cause poor mixing because of relatively low compatibility. According to the process of the present invention, however, even a urethane resin having such a combination can be mixed preferably.

In the production process of a hollow-fiber membrane filter element according to the present invention, a mixture of the two-liquid mixing type urethane resin is injected into a hollow-fiber membrane bundle preferably by utilizing a centrifugal force.

As illustrated in FIG. 3, a mixture 9 is poured into a pot 8 for adhesive. A mount (not illustrated) to which the pot 8 for adhesive and members (constituent members 4 to 7) for manufacturing a hollow-fiber membrane filter element are fixed is rotated in the direction of an arrow with a center line of this drawing as an axis of rotation so as to generate a centrifugal force from 10 to 50 G at end surfaces of a hollow-fiber membrane bundle 4.

The outlet of the pot 8 for adhesive is located nearer to the rotation center than the partition portion of the hollow-fiber membrane bundle 4. Such a constitution enables introduction of a mixture retained in the pot for adhesive into the end portion of the hollow-fiber membrane bundle through a tube connected to the outlet of the pot 8 for adhesive. By introducing the mixture by utilizing a centrifugal force, the mixture can be introduced uniformly into the hollow-fiber membrane bundle, making it possible to form a partition portion having no defect portions. Moreover, occurrence of soaking up of the mixture through the space between the hollow-fiber membranes by capillary action can be prevented by the application of a centrifugal force.

When the mixture not sufficiently mixed is injected utilizing a centrifugal force, it is apt to separate by the action of a centrifugal force so that a highly dispersed state is desired. Use of the mixing process according to the present invention realizes the highly dispersed state. In other words, when the mixture of the two-liquid mixing type curable resin is injected into the end portion of the hollow-fiber membrane bundle, application of the process for producing a mixture of a two-liquid mixing type curable resin according to the present invention achieves an especially marked effect.

When the pot life of the two-liquid mixing type curable resin is relatively short and is not more than 15 minutes, use of a centrifugal force as a power for transferring the resin between two or more static mixers is preferred.

FIG. 4 illustrates one example of a mixing line for such a case. Two adhesive pots 91 and 92 for a base and a curing agent, respectively, are connected to a static mixer 1 of a first stage via a pipe. The static mixer 1 of the first stage is connected to a static mixer 1' of a second stage via a non-stirring portion 2. The static mixer 1' of the second stage is connected to an adhesion cup 6. The base and the curing agent charged in the respective pots for adhesive are injected into a hollow-fiber membrane bundle 4 through the line of the static mixers by a centrifugal force. Particularly in the case of a two-liquid mixing type curable resin having a relatively short pot life not more than 15 minutes, such a constitution enables to form a partition portion having neither curing unevenness nor defect portions. Feeding of them by making use of a centrifugal force enables not only reduction of a residual resin amount in the static mixers and the like to the minimum and saving of a using amount of the resin but also re-use of the static mixers.

The fourth embodiment of the present invention will hereinafter be described specifically.

In the fourth embodiment of the present invention, there is provided a process for producing a hollow-fiber membrane filter element, which comprises:

a step of providing a non-mixing time after a mixed liquid of a two-liquid mixing type curable resin is obtained by carrying out at least one mixing operation of the constituents of the resin; and a step of feeding the mixed liquid to a static mixer by a centrifugal force to obtain a mixture of the two-liquid mixing type curable resin, injecting the mixture of the two-liquid mixing type curable resin into an end portion of a hollow-fiber membrane bundle by the centrifugal force to solidify the mixture and thereby bonding and fixing the end portion of the hollow-fiber membrane bundle.

In this embodiment, first of all, a base and a curing agent are mixed roughly by at least one mixing operation. The rough mixing operation may be performed either by mechanical stirring in a mixing tank or by feeding liquids to be mixed to a static mixer. Then, a non-mixing time is provided for the resulting mixed liquid. A ratio of the non-mixing time to the pot life TP of the resin is preferably from 0.001 to 0.5. The ratio of the non-mixing time less than 0.001 may tend to lessen an energy saving effect because the reaction does not proceed sufficiently. The ratio exceeding 0.5, on the other hand, may tend to raise the viscosity due to excessive progress of the reaction, leading to too much consumption of mixing energy or prevent smooth operation after mixing such as injecting of the mixture into a hollow-fiber membrane bundle. The ratio of the non-mixing time to the pot life TP is more preferably from 0.001 to 0.02. Also in this fourth embodiment, the two-liquid mixing type curable resin has a pot life of preferably from 5 to 60 minutes, more preferably from 15 to 50 minutes, especially preferably from 15 to 40 minutes. When the pot life is less than 5 minutes, defects may occur in the partition portion due to insufficient injecting time between hollow-fiber membranes. On the other hand, the pot life exceeding 60 minutes is not preferred, because it takes much time to complete a curing reaction, leading to poor productivity.

Also in this embodiment, two-liquid mixing type curable resins same as or similar to those described in the first to third embodiments can be used.

FIG. 5 illustrates one example of a mixing line for this embodiment. A pot 8 for adhesive is connected to a static mixer 1 and the static mixer 1 is connected to an adhesion cup 6 via a tube. The pot 8 for adhesive, the static mixer 1, and members (composed of members 4 to 7) for producing a hollow-fiber membrane filter element are fixed to a mount (not illustrated). A mixed solution 9 obtained by roughly mixing a base with a curing agent is poured into the pot 8 for adhesive and is rotated so as to generate a centrifugal force of from 10 to 50 G at the end surface of a hollow-fiber membrane bundle 4. The mixed liquid 9 is injected into the hollow-fiber membrane bundle 4 through a line of the static mixer by the centrifugal force. Here, a non-mixing time is a period of time until the initiation of the rotation immediately after the rough mixing.

A partition portion having neither curing unevenness nor defect portions can be formed by employing such a constitution. In addition, feeding by making use of a centrifugal force is advantageous because it enables not only reduction of a residual resin amount in the static mixer and the like to the minimum and saving of the using amount of the resin but also reuse of the static mixer.

EXAMPLES

Examples of the present invention will hereinafter be described. It should however be borne in mind that the present invention is not limited by them.

<Two-Liquid Mixing Type Curable Resin>

Two-liquid mixing type curable resins (urethane resins) used in Examples and Comparative Examples are shown in Table 1.

(Measuring Method of Pot Life)

A base and a curing agent adjusted to the temperature described in Table 1 were weighed at a predetermined weight ratio to give a total weight of 100 g. After mixing for 60 seconds and deaeration for 30 seconds in a rotary mixer/deaerator ("HYBRID MIXER HM-500", trade name; product of KEYENCE CORPORATION), the viscosity of the resulting mixed liquid was measured with time by a digital rotary viscometer ("VISCO BASIC PLUS", trade name; product of FUNGILAB S.A) and the period of time until the viscosity reached 10 Pa·s was determined. The period of time until the viscosity reached 10 Pa·s after the mixing was started was defined as a pot life. It is to be noted that during measurement, the sample to be measured was dipped in a bath adjusted to the temperature described in Table 1.

<Standard Conditions>

Weigh a base and a curing agent at a predetermined weight ratio to give a total weight of 100 g. Mix them for 60 seconds and deaerate them for 60 seconds in a rotary mixer/deaerator ("HYBRID MIXER HM-500", trade name; product of KEYENCE CORPORATION).

Leave the resulting mixture at rest at 23° C. for 2 hours and then, heat it at 50° C. for 24 hours.

After leaving the mixture to stand for 24 hours or more in an environment of 23° C., measure its hardness.

<Judging Method of Hardness Unevenness>

After the cured product obtained in each of Examples and Comparative Examples was left to stand for 24 hours or more in an environment of 23° C., hardness was measured using a durometer (ASKER Model D) at ten positions randomly selected. The hardness unevenness was judged "good" when the cured product had no position at which the hardness was lower by 20% or greater than that under the standard conditions; the hardness unevenness was judged "fair" when the cured product had one or more positions at which the hardness was lower by 20% or greater and had no position at which the hardness was lower by 40% or greater; and the hardness unevenness was judged "poor" when the cured product had one or more positions at which the hardness was lower by 40% or greater. It is to be noted that the hardness is a value 10 seconds after application of pressure to the sample by using the durometer.

Examples 1 to 5

As described in Table 2, two static mixers were connected in series via a non-stirring portion having an individual volume and a pressure of 0.6 MPa was applied to feed a mixed liquid.

The static mixers ("DSP-MXC13-32", trade name) each has an inner diameter of 13 mm, houses 32 mixing elements therein, and has an inner volume of 32 ml. As the non-stirring portion, a pressure hose ("Tetron blade hose", trade name) having a size as shown in Table 2 was used.

The mixture obtained was cured for 60 minutes in a temperature atmosphere shown in Table 2, followed by further curing for 8 hours at 50° C.

After the temperature was returned to room temperature (23° C.), the cured state of the resin was evaluated. The cured state of the resin is shown in Table 2. Any of the resins showed good cured state without stickiness or hardness unevenness on the surface thereof.

TABLE 1

|  |  |  | Resin A | Resin B | Resin C | Resin D |
|---|---|---|---|---|---|---|
| Base | Main component |  | MDI | MDI | MDI | MDI |
|  | Viscosity @25° C. | (mPa·s) | 1,200 | 1,100 | 3,900 | 3,400 |
| Curing agent | Main component |  | PBDG | PBDG | CAST | CAST |
|  | Viscosity @25° C. | (mPa·s) | 2,400 | 2,700 | 1,100 | 1,400 |
| Mixing ratio | Base/curing agent | (wt/wt) | 39/61 | 25/75 | 57/43 | 56/44 |
|  |  | (vol/vol) | 33/67 | 20/80 | 54/46 | 50/50 |
| Mixture | Temperature | (° C.) | 23 | 23 | 23 | 30 |
|  | Initial viscosity | (mPa·s) | 2,300 | 2,600 | 2,500 | 1,800 |
|  | Pot life | (min.) | 23 | 22 | 40 | 15 |
| Cured product | D hardness |  | 55 | 25 | 60 | 76 |

* MDI: MDI polyisocyanate
PBDG: Polybutadiene glycol
CAST: castor oil polyol
Hardness: Hardness of a product obtained by curing under the following standard conditions: A value 10 seconds after application of pressure by using a Type D durometer manufactured by Asker Examples 6 and 7

In a similar manner to Example 1 except that the two static mixers were connected in series by using a pressure hose (non-stirring portion) having a size as shown in Table 2, a cured product of the resin was obtained. The cured state of the resin is shown in Table 2.

Comparative Example 1

In a similar manner to Example 1 except that the two static mixers were connected directly without using the pressure hose (non-stirring portion), a cured product of a resin was obtained. The cured state of the resin is shown in Table 2.

followed by mixing by rotating a stirring blade for 10 seconds at a rate of 400 rpm. After the resulting mixed liquid was left at rest for a period of time specified in Table 3, it was mixed by rotating the stirring blade for 10 seconds at a rate of 400 rpm. The mixture thus obtained was deaerated for 30 seconds in a rotary mixer/deaerator ("HYBRID MIXER HM-500", trade name; product of KEYENCE Corporation), left at rest for 60 minutes for curing, and then cured by heating at 50° C. for 8 hours.

After the temperature was returned to room temperature (23° C.), the cured state of the resin was evaluated. The cured state of the resin is shown in Table 3. Any of the cured

TABLE 2

| | | Ex. 1 | Ex. 2 | Ex. 3 | Ex. 4 | Ex. 5 | Ex. 6 | Ex. 7 | Comp. Ex. 1 |
|---|---|---|---|---|---|---|---|---|---|
| Urethane resin | Abbreviated name | Resin A | Resin A | Resin B | Resin C | Resin D | Resin A | Resin B | Resin A |
| | Temperature (° C.) | 23 | 23 | 23 | 23 | 30 | 23 | 23 | 23 |
| | Pot life (min) | 23 | 23 | 22 | 40 | 15 | 23 | 22 | 23 |
| | (sec) | 1,380 | 1,380 | 1,320 | 2,400 | 900 | 1,380 | 1,320 | 1,380 |
| Mixing portion | Kind * number | STM * 2 | STM * 2 | STM * 2 | STM * 2 | STM * 2 | STM * 2 | STM * 2 | STM * 2 |
| | Total volume (ml) | 64 | 64 | 64 | 64 | 64 | 64 | 64 | 64 |
| | Mixing time (sec) | 2 | 2 | 2 | 2 | 2 | 2 | 2 | 2 |
| Non-stirring portion | Inner diameter (mm) | 15 | 15 | 25 | 25 | 25 | 15 | 15 | None |
| | Length (mm) | 1350 | 915 | 1000 | 1000 | 1000 | 510 | 510 | None |
| | Total volume (ml) | 238 | 162 | 490 | 490 | 490 | 90 | 90 | 0 |
| | Non-mixing time (sec) | 7.5 | 5.1 | 15.3 | 15.3 | 15.3 | 2.8 | 2.8 | 0 |
| Volume of non-stirring portion/volume of mixer portion | | 3.7 | 2.5 | 7.7 | 7.7 | 7.7 | 1.4 | 1.4 | 0 |
| Non-mixing time/mixing time | | 3.7 | 2.5 | 7.7 | 7.7 | 7.7 | 1.4 | 1.4 | 0 |
| Non-mixing time/pot life | | 0.005 | 0.004 | 0.012 | 0.006 | 0.017 | 0.002 | 0.002 | 0 |
| State of cured product | Stickiness | None | None | None | None | None | None | None | Some |
| | Hardness unevenness | Good | Good | Good | Good | Good | Fair | Fair | Poor |

*STM: Static mixer ("DSP-MXC13-32", trade name)

Examples 8 & 9

Described here is an example of a cured product of a resin obtained by mixing the constituents for a predetermined time in a stirring tank, leaving the resulting mixture at rest, and then mixing the mixture again.

The constituents were weighed to give a total amount 200 g and charged in a beaker having an inner volume of 300 ml, products of the resin exhibited a good cured state without stickiness and hardness unevenness on the surface.

Comparative Example 2

In a similar manner to Examples 8 and 9 except that mixing was performed by turning the stirring blade continuously for 20 seconds without leaving the mixture at rest. The cured state of the resin is shown in Table 3.

TABLE 3

| | | Example 8 | Example 9 | Comparative Example 2 |
|---|---|---|---|---|
| Urethane resin | Abbreviated name | Resin C | Resin C | Resin C |
| | Temperature (° C.) | 23 | 23 | 23 |
| | Pot life (min) | 40 | 40 | 40 |
| Mixing portion | Kind * number | AGT * 1 | AGT * 1 | AGT * 1 |
| | Total volume (ml) | 300 | 300 | 300 |
| | Initial mixing time (sec) | 10 | 10 | 10 |
| | Mixing time after leaving at rest (sec) | 10 | 10 | 10 |
| Leaving at rest | Non-mixing time (sec) | 90 | 45 | 0 |
| Non-mixing time/mixing time | | 4.5 | 2.3 | 0 |
| Non-mixing time/pot life | | 0.038 | 0.019 | 0 |
| State of cured product | Stickiness | None | None | None |
| | Hardness unevenness | Good | Good | Poor |

* AGT: Agitation tank type mixer

Example 10

Described here is an example of mixing Resin C by continuously feeding it into a pipe of a mixing system in which a stirring tank and a static mixer were connected in series via a pressure hose.

A stirring tank having a stirring blade in a cylinder having an inner diameter of 60 mm and an inner volume of 200 ml was connected in series with a static mixer ("DSP-MXC13-32", trade name, an inner diameter: 13 mm, the number of mixing elements: 32) via a pressure hose having an inner diameter of 25 mm and length of 1000 mm ("Tetron blade hose", trade name). Urethane A was mixed by feeding it into the resulting mixer at a flow rate of 32 ml/sec.

After the mixture was deaerated for 30 seconds by using a rotary mixer/deaerator ("HYBRID MIXER HM-500", trade name; product of KEYENCE Corporation), the deaerated mixture was cured by leaving it at rest for 60 minutes and then cured by heating at 50° C. for 8 hours. After returning it to room temperature (23° C.), a cured state of the resin was evaluated. The resin exhibited a good cured state without stickiness and hardness unevenness on the surface. The results are shown in Table 4.

It is to be noted that in Example 10, a non-mixing time TN/pot life TP ratio is 0.006.

Example 11

In a similar manner to Example 10 except that the length of the pressure hose was changed to 100 mm, a cured product of a resin was obtained. The cured state of the resin is shown in Table 4.

TABLE 4

|  |  | Example 10 | Example 11 |
|---|---|---|---|
| Urethane resin | Abbreviated name | Resin C | Resin C |
|  | Temperature (° C.) | 23 | 23 |
|  | Pot life (min) | 40 | 40 |
| Mixing portion (AGT) | Volume (ml) | 200 | 200 |
|  | Mixing time (sec) | 6.3 | 6.3 |
| Non-mixing portion | Inner diameter (mm) | 25 | 25 |
|  | Length (mm) | 1000 | 100 |
|  | Volume (ml) | 490 | 49 |
|  | Non-mixing time (sec) | 15.3 | 1.5 |
| Mixing portion (STM) | Volume (ml) | 32 | 32 |
|  | Mixing time (sec) | 1 | 1 |
| Non-mixing time/mixing time |  | 2.1 | 0.2 |
| Non-mixing time/pot life |  | 0.006 | 0.001 |
| State of cured product | Stickiness | None | None |
|  | Hardness unevenness | Good | Fair |

*AGT: Agitation tank type mixer

Example 12

Resin A was mixed by continuously feeding it into a pipe of a mixing apparatus in which two static mixers were connected in series via a pressure hose. The resulting mixture was injected into an end portion of a hollow-fiber membrane bundle by utilizing a centrifugal force to prepare a hollow-fiber membrane filter element.

Into an outer tube made of ABS and having an inner diameter of 154 mm and a length of 2.2 m, 6600 hollow-fiber membranes made of polyvinylidene fluoride and having an outer diameter of 1.2 mm and an inner diameter of 0.7 mm were inserted and an adhesion cup was fixed to the end portion of the hollow-fiber membrane bundle with a mounting nut. The constituent members of the filter element were fixed to a mount for centrifugal potting and as illustrated in FIG. 3, the adhesion cup and a pot for adhesive were connected via a polyethylene tube having an inner diameter of 10 mm.

A mixture (1600 ml) of Resin A obtained by mixing under similar conditions to those employed in Example 1 was poured into the pot for adhesive and immediately after that, the mount for centrifugal potting was rotated at a rate of 177 rpm to apply a centrifugal force of 35 G to a formation region of an adhered portion (in the vicinity of the end portion of the hollow-fiber membrane bundle 4). 90 minutes later, the rotation was stopped and the members were taken out from the mount for centrifugal potting, followed by heating for 8 hours in a dryer of 50° C. to accelerate curing. The adhered portion thus formed was then cut at the most end portion of the outer tube and a hollow was opened at the end portion of the hollow-fiber membranes to yield a hollow-fiber membrane filter element.

At the end surface of the adhered portion of the hollow-fiber membrane filter element, the cured product of the resin had a good surface without stickiness and hardness unevenness.

When the adhered portion of the hollow-fiber membrane filter element was cut out and the interface on the center side, in the length direction, of the filter element was observed, the adhesive penetrated substantially uniformly between the hollow-fiber membranes and no defect was detected. In addition, it was also confirmed that no stickiness appeared on the interface, suggesting that a good adhered portion was formed.

Example 13

By using an apparatus as illustrated in FIG. 4, a hollow-fiber membrane filter element was produced by mixing Resin D by feeding it by a centrifugal force to a pipe of a mixing apparatus in which two static mixers 1 and 1' were connected in series via a pressure hose 2 and injecting the resulting mixture into an end portion of a hollow-fiber membrane bundle 4 by a centrifugal force.

As in Example 12, constituent members of a hollow-fiber membrane filter element were fixed to a mount for centrifugal potting. Two pots for adhesive and two static mixers were fixed onto a mount for centrifugal potting on the side of one end portion of the hollow-fiber membrane bundle as illustrated in FIG. 4. The static mixers are each "DSP-MXC13-32" (trade name; inner diameter: 13 mm, the number of mixing elements: 32). The two pots for adhesive were connected to the static mixer of the first stage. The static mixer of the second stage was connected to the static mixer of the first stage via a polyethylene tube (inner diameter: 25 mm, length: 1000 mm). The static mixer of the second stage was connected to an adhesion cup via a polyethylene tube having an inner diameter of 10 mm.

A base and a curing agent for Resin D were measured to give a total amount of 1600 ml and they were poured into the pots for adhesive, respectively. The mount for centrifugal potting was rotated at a rate of 212 rpm so as to apply a centrifugal force of 50 G to the formation region of an adhered portion (in the vicinity of the end portion of the hollow-fiber membrane bundle 4). The temperature of each of the base and the curing agent was adjusted to 30° C. in advance and the temperature in each of the pipe and a centrifugal potting apparatus to be fed with them was adjusted to 30° C. 90 minutes later, the rotation was stopped and the constituent members were taken out from the mount for centrifugal potting and heated for 8 hours in a dryer of 50° C. to accelerate the curing reaction. Then, the adhered portion thus formed was cut out at the most end position of the outer tube and a hollow was opened at the end portion of the hollow-fiber membrane to yield a hollow-fiber membrane filter element.

At the end surface of the adhered portion of the hollow-fiber membrane filter element, the cured product of the resin had a good surface without stickiness and hardness unevenness.

When the adhered portion of the hollow-fiber membrane filter element was cut out and the interface, on the center side, in the length direction of the filter element was observed, the adhesive penetrated substantially uniformly between the hollow-fiber membranes and no defect was detected. It was also confirmed that no stickiness appeared on the interface, suggesting that a good adhered portion was formed.

In this Example, the total volume of the non-stirring portion is 7.7 times as much as the total volume of the mixing portion and a non-mixing time TN/pot life TP ratio is 0.017.

Example 14

After feeding Resin D to a static mixer and roughly mixing it therein, the resulting mixed liquid was fed to another static mixer by a centrifugal force to mix it again. The resulting mixture was injected into an end portion of a hollow-fiber membrane bundle by a centrifugal force to produce a hollow-fiber membrane filter element.

As in Example 12, constituent members of a hollow-fiber membrane filter element were fixed to a mount for centrifugal potting. A pot 8 for adhesive and a static mixer 1 ("DSP-MXC13-32", trade name; an inner diameter: 13 mm, the number of mixing elements: 32) were fixed to the mount for centrifugal potting on the side of an end portion of a hollow-fiber membrane bundle 4 as illustrated in FIG. 5. The pot 8 for adhesive was connected to the static mixer 1 via a polyethylene tube (inner diameter: 10 mm, length: 50 mm) and the static mixer 1 was connected to an adhesion cup 6 via a polyethylene tube having an inner diameter of 10 mm.

A base and a curing agent for Resin D were measured to give a total amount of 1600 ml. They were fed to the static mixer ("DSP-MXC13-32", trade name, inner diameter: 13 mm, the number of mixing elements: 32) at a flow rate of 32 ml/sec. The roughly mixed liquid thus obtained was poured into the pot 8 for adhesive. 90 seconds after the initiation of the mixing, the rotation of the mount for centrifugal potting was started. It was rotated at a rate of 200 rpm so as to apply a centrifugal force of 45 G to the formation region of an adhered portion. The temperature of each of the base and the curing agent was adjusted to 30° C. in advance and the temperature in each of the pipe and a centrifugal potting apparatus to be fed with them was adjusted to 30° C. 90 minutes later, the rotation was stopped and the constituent members were taken out from the mount for centrifugal potting and heated for 8 hours in a dryer of 50° C. to accelerate the curing reaction. Then, the adhered portion thus formed was cut out at the most end position of the outer tube and a hollow was opened at the end portion of the hollow-fiber membrane to yield a hollow-fiber membrane filter element.

At the end surface of the adhered portion of the hollow-fiber membrane filter element, the cured product of the resin had a good surface without stickiness and hardness unevenness.

When the adhered portion of the hollow-fiber membrane filter element was cut out and the interface, on the center side, in the length direction of the filter element was observed, the adhesive penetrated substantially uniformly between the hollow-fiber membranes and no defect was detected. It was also confirmed that no stickiness appeared on the interface, suggesting that a good adhered portion was formed.

In this Example, a non-mixing time TN/pot life TP ratio is 0.10.

Industrial Applicability

The process for producing a mixture according to the present invention enables efficient preparation of a cured product of a resin having no defect portions such as hardness unevenness by mixing a two-liquid mixing type curable resin (for example, urethane resin or epoxy resin) and curing the resulting mixture so that it can be used preferably as a process for producing a mixture of a curable resin with a short pot life. The process for producing a mixture according to the present invention can be utilized in general mixing applications of two-liquid mixing type curable resins, but is especially useful as a process for producing a mixture of an adhesive in the manufacture of a hollow-fiber membrane filter element.

Figure 1:
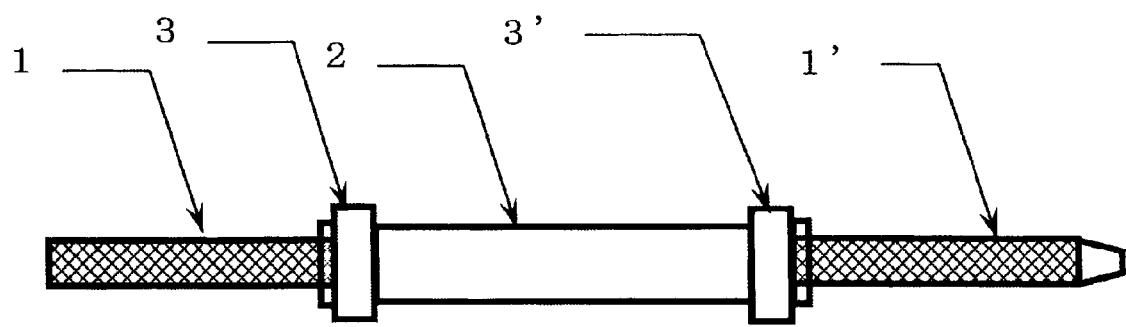
FIG. 1 illustrates one example of an embodiment of the present invention in which a static mixer of a first stage, a non-stirring portion without a mixing element, and a static mixer of a second stage are connected to each other.
Figure 2:
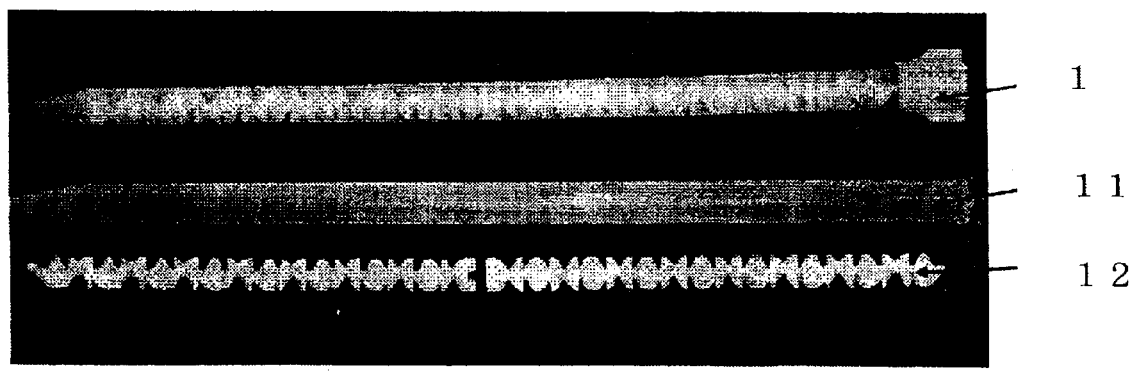
FIG. 2 illustrates one example of the structure of a static mixer to be used in the present invention.
Figure 3:
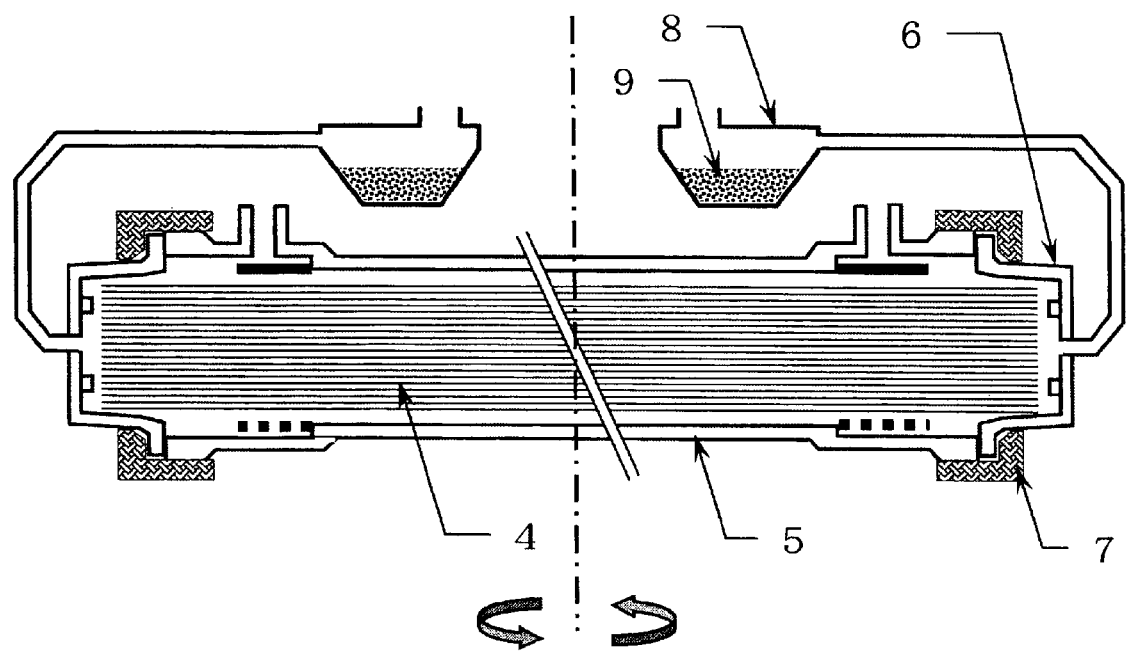
FIG. 3 is a schematic view illustrating one example of an embodiment of the process for producing a hollow-fiber membrane filter element according to the present invention in which centrifugal potting is performed.
Figure 4:
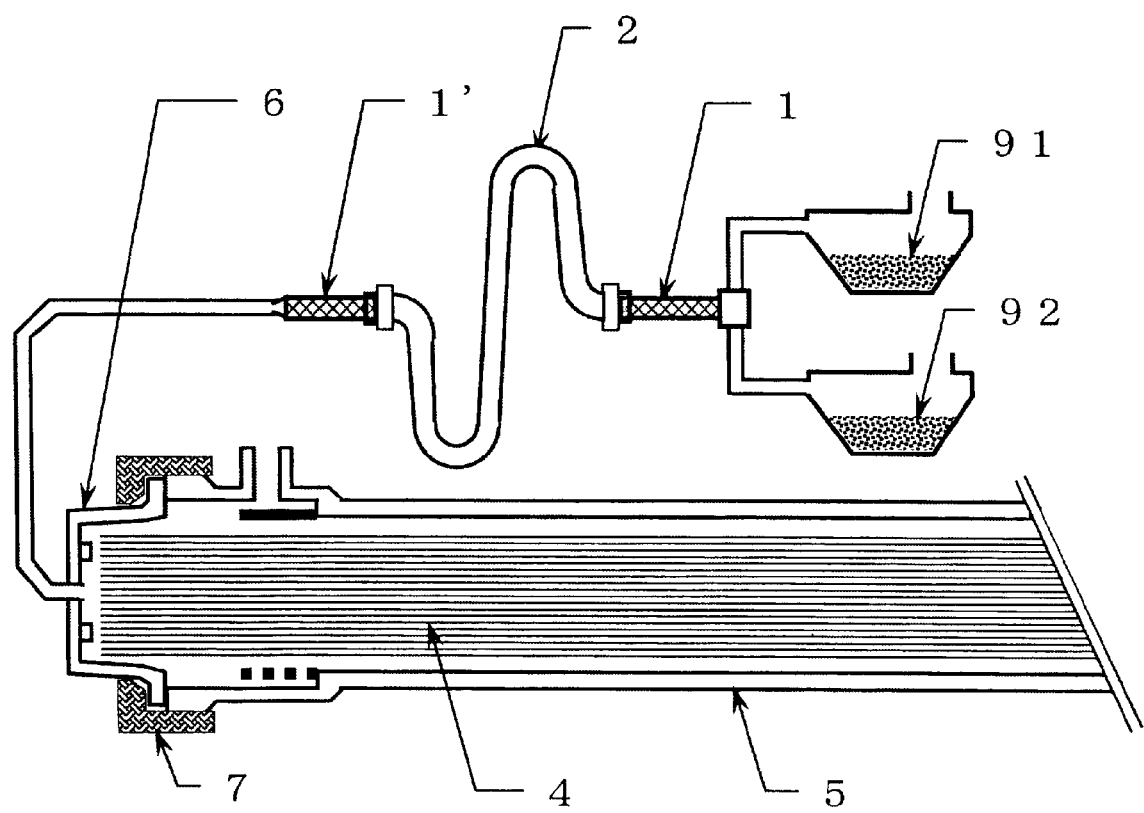
FIG. 4 is a schematic view illustrating one example of another embodiment of the process for producing a hollow-fiber membrane filter element according to the present invention in which centrifugal potting is performed.
Figure 5:
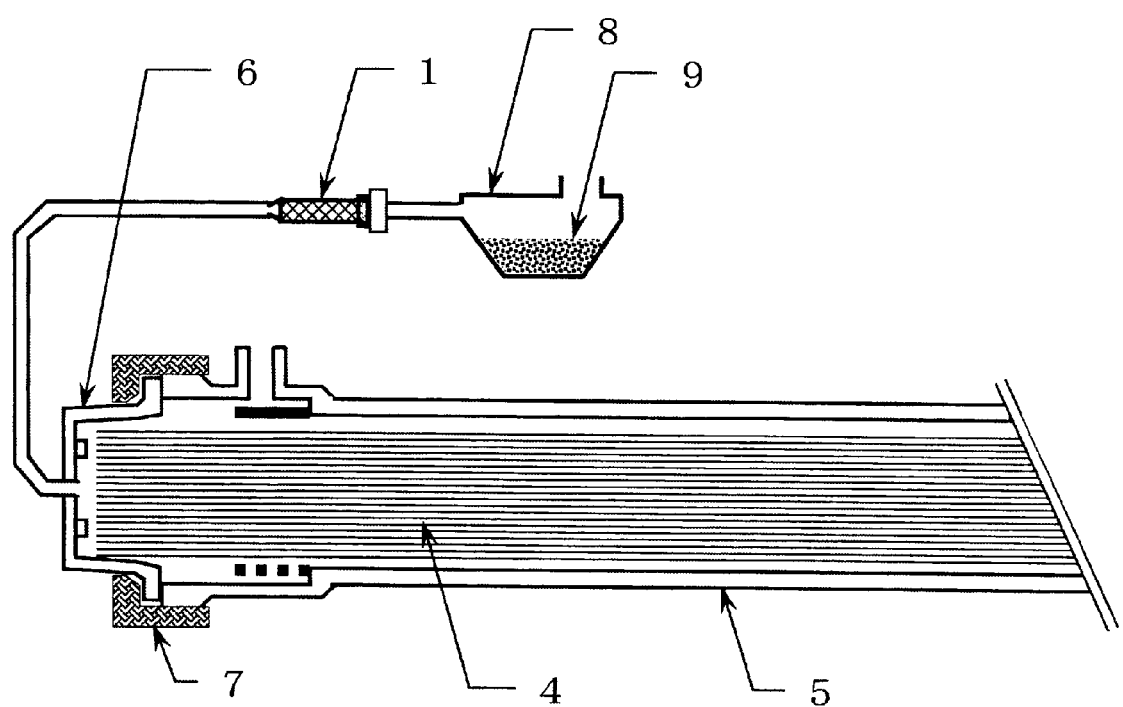
FIG. 5 is a schematic view illustrating one example of a further embodiment of the process for producing a hollow-fiber membrane filter element according to the present invention in which centrifugal potting is performed.

| Description of Symbols | |
|---|---|
| 1, 1': | Static mixer |
| 11: | Flame |
| 12: | Mixing element |
| 2: | Non-stirring portion (non-mixing zone) |
| 3, 3': | Connecting member |
| 4: | Hollow-fiber membrane |
| 5: | Outer tube |
| 6: | Adhesion cup |
| 7: | Nut |
| 8: | Pot for adhesive |
| 9: | Mixed liquid |
| 91: | Base |
| 92: | Curing agent |

The invention claimed is:

1. A process for producing a hollow-fiber membrane filter element, comprising:
   a step of injecting a mixture of a two-liquid mixing type curable resin produced by;
   mixing constituents of the two-liquid mixing type curable resin,
   wherein the constituents are fed into a mixing channel in which two or more static mixers are arranged in series, a non-stirring portion having no mixing element is disposed between at least one of the static mixers and another one of the static mixers placed downstream thereof, and a total volume of the non-stirring portion is from 2 to 10 times as much as a total volume of mixing portions of the static mixers, and wherein each static mixer comprises a cylindrical frame containing mixing units, each made of a plurality of elements connected to each other in the longitudinal direction and each having a shape conforming to a shape obtained by twisting a plate-like body in the circumferential direction along the longitudinal direction and any tow elements adjacent to each other are twisted in mutually opposite directions so that the liquids to be mixed move while being inverted, into an end portion of a hollow-fiber membrane bundle composed of a plurality of hollow-fiber membranes and solidifying the mixture, thereby bonding and fixing the end portion of the hollow-fiber membrane bundle.

2. The process for producing a hollow-fiber membrane filter element according to claim 1, wherein the mixture of the two-liquid mixing type curable resin is injected into the end portion of the hollow-fiber membrane bundle by a centrifugal force.

3. The process for producing a hollow-fiber membrane filter element according to claim 1, wherein the mixture of the two-liquid mixing type curable resin is obtained by feeding the constituents to the mixing channel by a centrifugal force.

4. A process for producing a hollow-fiber membrane filter element, comprising:

a mixing step of carrying out at least one mixing operation of constituents of a two-liquid mixing type curable resin to obtain a mixed liquid and then providing a non-mixing time; and a fixing step of feeding the mixed liquid into a static mixer by a centrifugal force to obtain a mixture of the two-liquid mixing type curable resin, injecting the mixture of the two-liquid mixing type curable resin into an end portion of a hollow-fiber membrane bundle by a centrifugal force and solidifying the mixture, thereby bonding and fixing the end portion of the hollow-fiber membrane bundle, and wherein each static mixer comprises a cylindrical frame containing mixing units, each made of a plurality of elements connected to each other in the longitudinal direction and each having a shape conforming to a shape obtained by twisting a plate-like body the circumferential direction along the longitudinal direction, wherein any two elements adjacent to each other are twisted in mutually opposite directions so that liquids to be mixed move while being inverted.

5. The process for producing a hollow-fiber membrane filter element according to claim 4, wherein in the mixing step, a total non-mixing time TN is from 2 to 100 times as much as a total time TB of the mixing operation.

6. The process for producing a hollow-fiber membrane filter element according to claim 4, wherein the two-liquid mixing type curable resin has a pot life TP from 5 to 60 minutes.

7. The process for producing a hollow-fiber membrane filter element according to claim 6, wherein a total time TN of the non-mixing time is from 0.001 to 0.5 times as much as the pot life TP.

8. The process for producing a hollow-fiber membrane filter element according to claim 4, wherein the two-liquid mixing type curable resin is a urethane resin.

* * * * *